United States Patent [19]
Stewart et al.

[11] Patent Number: 6,018,360
[45] Date of Patent: Jan. 25, 2000

[54] METHOD OF SWITCHING A CALL TO A MULTIPOINT CONFERENCE CALL IN A H.323 COMMUNICATION COMPLIANT ENVIRONMENT

[75] Inventors: Randall R. Stewart, Crystal Lake; Qiaobing Xie, Palatine, both of Ill.

[73] Assignee: Motorola, Inc., Schaumburg, Ill.

[21] Appl. No.: 09/150,149

[22] Filed: Sep. 9, 1998

[51] Int. Cl.[7] ....................................................... H04N 7/14
[52] U.S. Cl. ................................ 348/15; 348/16; 379/202
[58] Field of Search ................................ 348/14, 15, 16; 379/202; 395/200.34, 200.35

[56] References Cited

U.S. PATENT DOCUMENTS

| | | |
|---|---|---|
| 4,232,199 | 11/1980 | Boatwright et al. |
| 5,193,110 | 3/1993 | Jones et al. |
| 5,563,882 | 10/1996 | Bruno et al. .............................. 379/202 |
| 5,625,407 | 4/1997 | Biggs et al. ................................ 348/16 |
| 5,673,080 | 9/1997 | Biggs et al. |
| 5,778,053 | 7/1998 | Skarbo et al. .............................. 348/14 |
| 5,909,431 | 6/1999 | Kuthyar et al. ........................... 370/260 |

FOREIGN PATENT DOCUMENTS

WO 98/57485  12/1998  Norway ........................... H04M 3/56

OTHER PUBLICATIONS

ITU–T Telecommunication Standardization Sector of ITU H.245 (Mar. 1996); Series H:Audiovisual and Multimedia Systems Infrastructure of Audiovisual Services—Communication Procedures "Control Protocol for Multimedia Communications".

ITU–T Telecommunication Standardization Sector ITU H.323 (Nov. 1996); Series H: Audtiovisual and Multimedia Systems Infrastructure of Audiovisual Services—Systems and Terminal Equipment for Audiovisual Services "Visual Telephone Systems and Equipment for Local Area Networks which Provide a Non–Guaranteed Quality of Service".

*Primary Examiner*—Curtis A. Kontz
*Assistant Examiner*—Melur Ramakrishnaiah
*Attorney, Agent, or Firm*—Sayed Hossain Beladi

[57] ABSTRACT

A method of switching a call to a multipoint conference call includes sending a message (201) from a first terminal (105-T1) to a gatekeeper (102) which provides address translation and control access to a shared network medium (101). The call is initially established as a point to point communication between first terminal (101) and a second terminal (105-TN) over shared network medium (101) while complying with H.323 standard. Message (201) contains a request for the multipoint conference call. The method furthermore includes selecting a multipoint control unit (104) connected to shared network medium (101) to allocate resources for the multipoint conference call, and then switching the call to the multipoint conference call via the allocated resources. Thereby, the initial call is switched to a multipoint conference call without interrupting the initial call.

12 Claims, 2 Drawing Sheets

METHOD OF SWITCHING A CALL TO A MULTIPOINT CONFERENCE CALL IN A H.323 COMMUNICATION COMPLIANT ENVIRONMENT

FIELD OF THE INVENTION

The present invention generally relates to multimedia communication over a shared network medium.

BACKGROUND OF THE INVENTION

Multimedia communication and its associated system hardware are known. One or more examples are described in the recommended standards published by the International Telecommunication Union (ITU). ITU is an agency of the United Nations specialized in the field of telecommunications. The ITU is responsible for studying technical, operating and tariff questions; and it issues recommendations about them with the view to standardize telecommunications on a world wide basis. One such recommended standard is found in the series H: Audiovisual and Multimedia Systems, H.323: Visual Telephone Systems and Equipment for Local Area Networks, and H.245: Control Protocol for Multimedia Communication. A copy of the recommended standards may be obtained by contacting the United Nations, New York, N.Y., USA.

Since such recommendations are for the world wide use, the standard are incorporated with many provisions for different equipments and systems around the world. To provide multimedia communication, the terminals connected to a shared network medium, such as a local area network, are required to have a minimum hardware resource. All H.323 terminals shall have an audio codec, and be capable of encoding and decoding speech according to predefined recommendations. A video codec is optional. If video codec is used in the terminal device, the video encoding and decoding are according to predefined recommendations. A system control unit provides signaling for proper operation of a H.323 terminal. The system control unit operates according to H.245 standard. To carry multimedia communication between two end points, such as two terminals, a control channel and a logical channel according to H.245 are established between the terminals.

A terminal may receive more than one audio channel, particularly in a multipoint conference call involving the terminal. In a multipoint conference call, therefore, there is a need for performing an audio mixing function in order to present the composite audio signal to users of the multipoint conference call. The terminals indicate via H.245 signaling the information regarding the number of simultaneous audio streams capable of decoding and encoding.

In addition, there is a need for a multipoint controller which provides for the control of three or more terminals participating in a multipoint conference call. The multipoint controller also may connect two terminals in a point-to-point call which later may develop into a multipoint conference call. The multipoint controller provides capability negotiation with all terminals to achieve common levels of communications. In addition, it may control conference resources such as multicasting video. The multipoint controller does not perform mixing or switching of audio, video and data.

The multipoint controller may be a stand alone terminal connected to the shared network medium, or it may be a part of a terminal generating or receiving audio and video signals. If the multipoint controller is stand alone, it may additionally have a multipoint processor. Multipoint processor provides for a centralized processing of audio, video and data in a multipoint conference call. The multipoint controller and multipoint processor may be combined in a unit called multipoint control unit. The multipoint control unit communicates to other entities, such as other terminals, according to H.323 standard.

There are normally a gateway and a gatekeeper connected to the shared network medium. The gateway connected to the shared network medium provides a real time two-way communications between terminals complying with H.323 standard and terminals connected to other networks. The gatekeeper provides address translation and control access to the local area network for H.323 terminals, gateways, and multipoint control units. A call between two or more terminals may be a direct call between the two terminals or via the gatekeeper.

To have a multipoint conference call, the call should be established as a multipoint conference call, or switched to a multipoint conference call after the call has initially been established. If the initial call is between two terminals, the call may be switched to a multipoint conference call only if at least one of the terminals has a multipoint controller or if initially resources of a multipoint control unit was allocated in the call setup. If the call is initially setup between two terminals, normally, there is no need to allocate resources of a multipoint control unit, unless multipoint conference call feature was initially requested. If neither of the terminals has a multipoint controller, the call between two terminals can not be switched to a multipoint conference call because the multipoint controller resource, which is required for multipoint conference call, can not be added to the control signaling after the initial call set up due to lack of provisions made in H.323 standard.

There are many terminals built and used around the world by complying with H.323 standard, such terminals may not have internal multipoint control resources in order to save cost and complexity of the terminals. The multipoint control resource may be allocated via a multipoint control unit at an address location on the shared network medium. Therefore, for the terminals that do not have a multipoint control resource, and the call initially has not been setup with allocation of multipoint control resource, switching the call into a multipoint conference call is impossible, unless the initial call is terminated and a new call with multipoint control resource is established.

Therefore, there is a need to provide for a method that allows terminals without multipoint control resource while complying with H.323 standard to switch a call to a multipoint conference call without reestablishing a new call.

DETAILED DESCRIPTION OF PREFERRED EMBODIMENT(S)

According to various aspects of the invention, a method of switching a call to a multipoint conference call includes sending a message from a first terminal to a gatekeeper which provides address translation and control access to a shared network medium. The call is initially established as a point to point communication between the first terminal and a second terminal over the shared network medium while complying with H.323 standard. The message contains a request for the multipoint conference call. Furthermore, the method includes selecting a multipoint control unit connected to the shared network medium to allocate resources for the multipoint conference call, and then switching the call to the multipoint conference call via the allocated resources. Accordingly, by subsequently connecting additional terminals to the multipoint conference call, the initial call is switched to a multipoint conference call without interrupting the initial call.

In order to make smooth transition from the call to the multipoint conference call, the method further includes the step of sending a message from the gatekeeper to the second terminal informing the second terminal of the request for multipoint conference call. The second terminal in response may reject or accept the multipoint conference call. Such a response from the second terminal assures the second terminal acquiesce for participating in a multipoint conference call.

Since the gatekeeper knows the address of all entities connected to the shared network medium, the gatekeeper selects the multipoint control unit that is used for its multipoint control resources. The call may have some associated parameters and address information, such as audio codec and video codec parameter settings and location information of involved entities. Such parameters may collectively be called H.245 parameters because they involve control information. Therefore, the method further includes the step of communicating to the multipoint control unit the H.245 channel parameters associated with the call before switching the call to the multipoint conference call. Although there are many different types of shared network medium, the shared network medium contemplated according to the invention is a local area network. Moreover, the communication over the shared network medium, such as a local area network, is in accordance with H.323 protocol.

Figure 1:
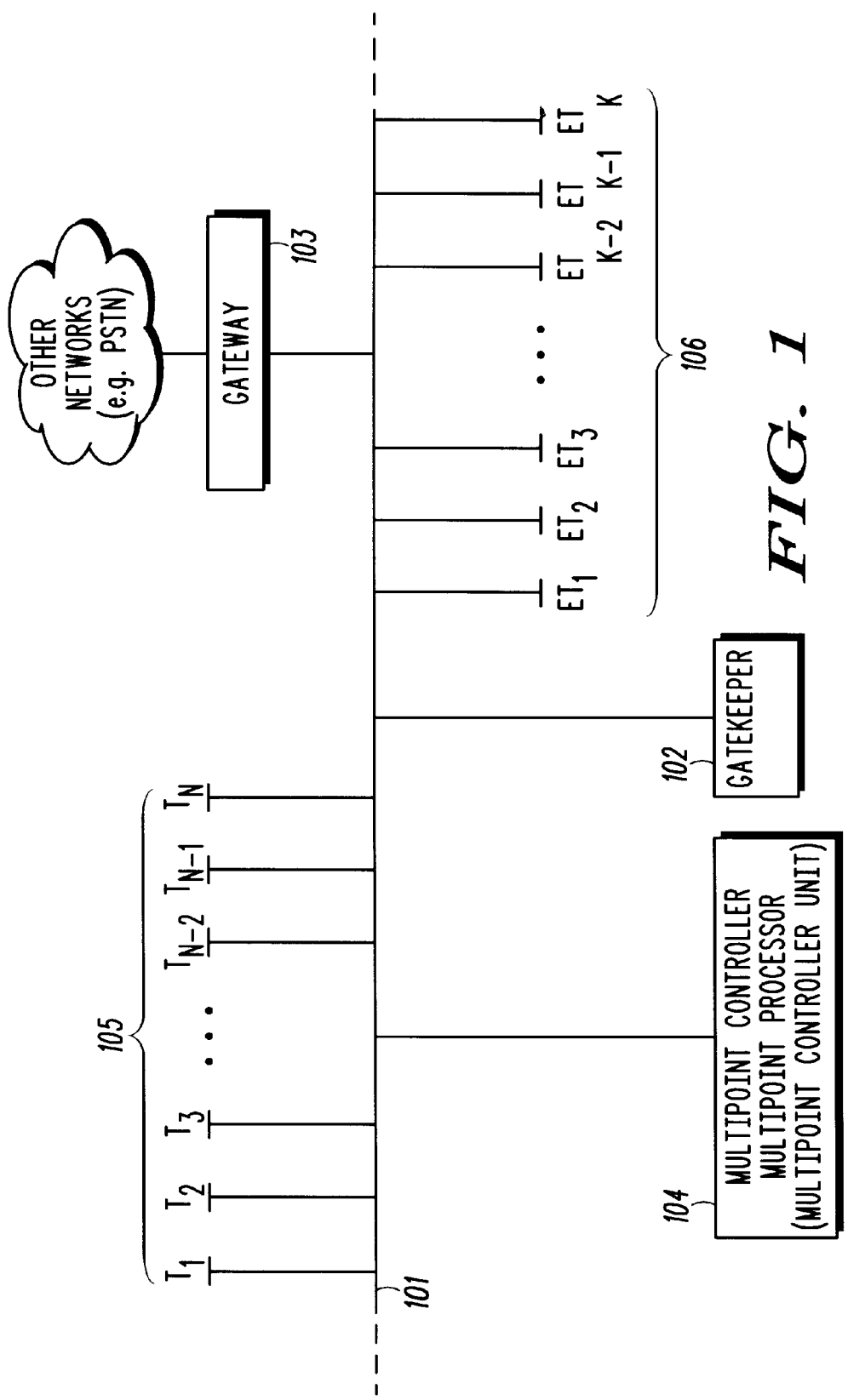
FIG. 1 depicts a shared network medium with associated terminals.

Referring to FIG. 1, a simplified block diagram of a shared network medium 101 with associated terminals is shown. Terminals communicate via network 101 with each other and to other networks via a gateway 103 while complying with H.323 standard. A terminal such as a gatekeeper terminal 102 holds address location of all other terminals that are locally connected to network 101. Terminals 105 are basic terminals. Although basic terminals may have different features and capabilities, the basic terminals contemplated according to the invention do not have at least a multipoint control resource. If a multipoint conference call is established initially between any two terminals of terminals 105, a multipoint controller unit 104 with at least multipoint controller resource is integrated in the call setup to provide multipoint conference call control function. More than one multipoint controller units, such as 104, may be connected to network 101, only one is shown here.

Terminals 106 are enhanced terminals. Enhanced terminals have in addition to basic capacity at least a multipoint control resource built in them. An internal multipoint control resource normally is used only by the terminal that includes it. In contrast, multipoint controller unit 104 resources may be used by any terminals when the resources are not in-use by other terminals. Multipoint controller unit 104 may accommodate from one to multiple multipoint conference calls between various terminals.

A call may be a direct call between the two terminals if the originating terminal knows the exact location of the receiving terminal, or it may be setup via gatekeeper 102. Either way, when a call is setup between any two terminals of terminals 105, and a multipoint conference call initially is not requested, the call may not be switched to a multipoint conference call, unless the initial call is terminated and a new call with allocation of multipoint conference call resources is setup. This highly undesirable situation among terminals 105 is solved in accordance with one or more advantages of the invention.

According to various aspects of the invention, a method of switching a call to a multipoint conference call includes sending a message from a first terminal, for example 105-T1, to gatekeeper 102 which provides address translation and control access to shared network medium 101. The message contains a request for the multipoint conference call. The call is initially established as a point to point communication between terminal 105-T1 and a second terminal, such as 105-TN, over shared network medium 101 without allocation of multipoint control resources. All entities connected to shared network medium 101 operate according to H.323 standard. Furthermore, the multipoint control unit 104 connected to shared network medium 101 is selected to provide resources for the multipoint conference call, and then the call is switched to the multipoint conference call via the selected multipoint control resources. Accordingly, the initial call is switched to a multipoint conference call, by subsequently connecting additional terminals to the multipoint conference call, without interrupting the initial call. The communication of terminals over network 101 is according to the H.323 standard.

Figure 2:
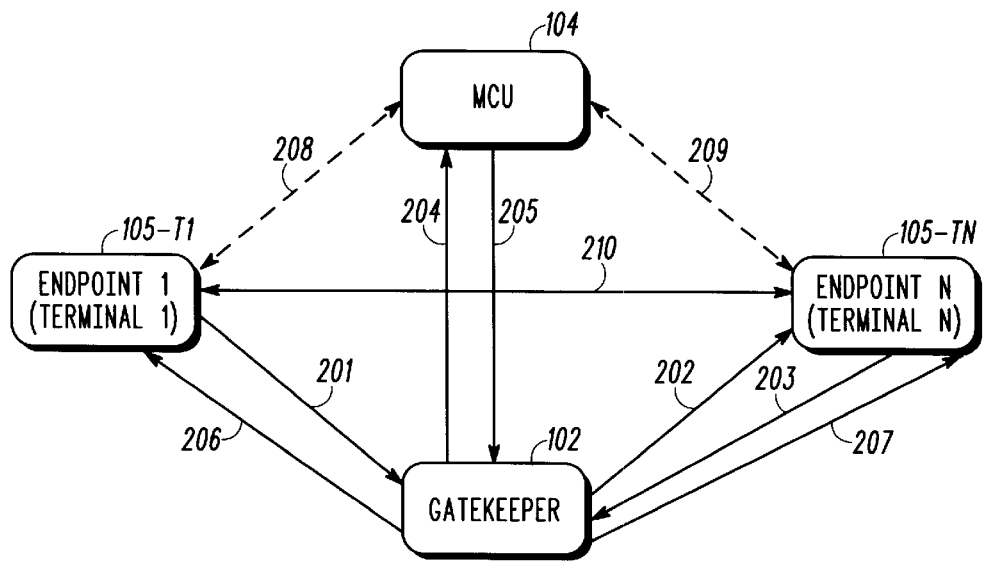
FIG. 2 depicts a method for switching a call to a multipoint conference call according to various embodiments of the invention.

Referring to FIG. 2, a method is shown for switching a call to a multipoint conference call according to various embodiments of the invention. The call is established between terminals 105-T1 and 105-TN as a point-to-point call via gatekeeper 102. The call as initially was setup did not allocate any multipoint control resources. The call may be switched to a multipoint conference call according to a preferred embodiment of the invention by following:

1—send a message 201 from terminal 105-T1 to gatekeeper 102 requesting multipoint conference call service; terminal 105-T1 in addition may inform gatekeeper 102 about its capabilities related to H.245 standard;

2—send a message 202 from gatekeeper 102 to terminal 105-TN informing it about change of the call to a multipoint conference call;

3—send a message 203 from terminal 105-TN accepting or rejecting the multipoint conference call; if terminal 105-TN accepts the multipoint conference call, proceed to subsequent steps; Terminal 105-T1 in addition may inform gatekeeper 102 about its capabilities related to H.245 standard;

4—send a message 204 from gatekeeper 102 to multipoint control unit 104 for allocation of free multipoint control resources; in addition, gatekeeper 102 may send H.245 information related to terminals 105-T1 and 105-TN;

5—send a message 205 from multipoint control unit 104 to gatekeeper 102 when multipoint control resources are available;

6—send messages 206 and 207 to terminals 105-T1 and 105-TN informing them of a subsequent transition to a multipoint conference call;

7—send messages 208 and 209 from terminals 105-T1 and 105-TN to multipoint control unit 104 for setting up control and media channels through multipoint control unit 104;

8—exchanging one or more messages 210 between terminals 105-T1 and 105-TN for acknowledging and accepting of the multipoint conference call and terminating the initial call.

When the initial call is setup, the call may be directly setup between the terminals without the assistance of a gatekeeper. Such a direct call setup is possible if the call originating terminal knows the address of the receiving terminal on the shared network medium. According to various aspects of the invention, a method of switching a call to a multipoint conference call includes establishing a communication between a first terminal, such as 105-T1 and a multipoint control unit, such as multipoint control unit 104, connected to a shared network medium, such as network 101, to provide resources for the multipoint conference call. The call is initially established over shared network medium 101 as a direct point-to-point communication between the first terminal and a second terminal, such as 105-TN. The communication between terminal 105-T1 and multipoint control unit 104 includes a request for the multipoint conference call and an acknowledgment of availability of resources for the multipoint conference call. Furthermore, the method includes sending a message from the first terminal to the second terminal informing the second terminal of the address location of the multipoint control unit on the shared network medium, and exchanging messages between the second terminal and the multipoint control unit requesting and acknowledging information associated with the resources for the multipoint conference call. Subsequently, the call is switched to the multipoint conference call. All entities connected to the shared network medium operate according to H.323 standard.

In order to facilitate smooth and uninterrupted transition of the call to a multipoint conference call with acquiesce of the terminals involved, the method further includes sending a message from the first terminal to the second terminal informing the second terminal of the request for multipoint conference call. The second unit in response sends a message accepting or rejecting the multipoint conference call. Moreover, exchanging messages between the second terminal and the multipoint control unit includes information associated with H.245 parameters.

Figure 3:
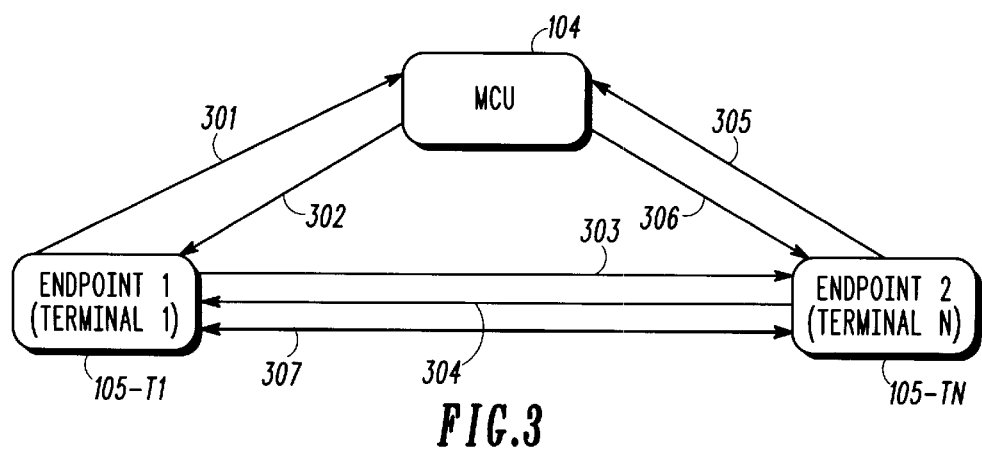
FIG. 3 depicts a method for switching a call to a multipoint conference call according to various embodiments of the invention.

Referring to FIG. 3, a method is shown for switching a call to a multipoint conference call according to various embodiments of the invention. The call is established between terminals 105-T1 and 105-TN as a direct call without an assistance from a gatekeeper. The call as initially was setup did not allocate any multipoint control resources. Terminal 105-T1 that needs to originated the multipoint conference call knows the address locations of 105-TN and multipoint control unit 104. The call may be switched to a multipoint conference call according to a preferred embodiment of the invention by following:

1—sending a message 301 from terminal 105-T1 to multipoint control unit 104 requesting and allocating multipoint control resources;

2—sending a message 302 from multipoint control unit 104 to terminal 105-T1 acknowledging the availability of multipoint control resources; the messages 301 and 302 may also include H.245 information to be used for the subsequent multipoint conference call;

3—sending a message 303 from terminal 105-T1 to terminal 105-TN informing it about the location of allocated multipoint control resources in multipoint control unit 104;

4—sending a message 304 from terminal 105-TN to terminal 105-T1 accepting or rejecting multipoint conference call; if terminal 105-TN accepts the multipoint conference call, proceed to the subsequent step;

5—sending messages 305 and 306 between terminal 105-TN and multipoint control unit 104 for exchange of H.245 and other necessary channels information;

6—exchanging messages 307 between terminals 105-T1 and 105-TN for termination of the ongoing call and transition to the multipoint conference call. Therefore, a call between two basic terminals, that has not secured allocation of multipoint control resources on its initial call setup, may be switched to a multipoint conference call without interruption. The call initially may or may not have been setup with assistance of a gatekeeper.

All the messages shown in FIGS. 2 and 3 may be sent according to standard multimedia control messaging scheme as explained in the H.323 and H.245 standards, or according to non-standard messaging allowed in the H.323 and H.245 standards. The non-standard messaging may be of two types, the first type is a non-standard messaging, and the second is a standard messaging with non-standard field extension. If standard messaging with non-standard field extension is used for sending any of the messages, the equipment used in the network may need to have prior knowledge about the non-standard extension messaging format.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What is claimed is:

1. A method of switching a point to point call to a multipoint conference call in a H.323 communication compliant environment comprising the steps of:

sending a message from a first terminal to a gatekeeper which provides address translation and control access to a shared network medium over which said point to point call is initially established between said first terminal and a second terminal, wherein said message contains a request for said multipoint conference call;

selecting a multipoint control unit connected to said shared network medium to provide capability for said multipoint conference call;

switching said point to point call to said multipoint conference call without interrupting said point to point call;

sending a message from said gatekeeper to said second terminal informing said second terminal of said request.

2. The method as recited in claim 1 further comprising the step of rejecting said multipoint conference call by said second terminal.

3. The method as recited in claim 1 further comprising the step of accepting said multipoint conference call by said second terminal.

4. The method as recited in claim 1 wherein said selecting said multipoint control unit is by said gatekeeper.

5. The method as recited in claim 1 further comprising the step of communicating to said multipoint control unit H.245 channel parameters associated with said point to point call before said switching said point to point call to said multipoint conference call step.

6. The method as recited in claim 1 wherein said shared network medium is a local area network.

7. A method of switching a point to point call to a multipoint conference call in a H.323 communication compliant environment comprising the steps of:

establishing a communication between a first terminal and a multipoint control unit connected to a shared network to provide resources for said multipoint conference call, said point to point call is initially established over said shared network medium as a point to point communication between said first terminal and a second terminal, wherein said communication includes a request for said multipoint conference call and an acknowledgment of availability of resources for said multipoint conference call;

sending a message from said first terminal to said second terminal informing said second terminal of the address location of said multipoint control unit on said shared network medium;

exchanging messages between said second terminal and said multipoint control unit requesting and acknowledging information associated with said resources for said multipoint conference call;

switching said point to point call to said multipoint conference call without interrupting said point to point call;

wherein said exchanging messages between said second terminal and said multipoint control unit further includes information associated with H.245 parameters.

8. The method as recited in claim 7 further comprising a step of sending a message from said first terminal to said second terminal informing said second terminal of said request.

9. The method as recited in claim 7 further comprising a step of sending a message from said second terminal accepting said multipoint conference call.

10. The method as recited in claim 7 further comprising a step of sending a message from said second terminal rejecting said multipoint conference call.

11. The method as recited in claim 10 further comprising the step of terminating said communication.

12. The method as recited in claim 7 wherein said communication further includes communication of information associated with H.245 parameters.

* * * * *